United States Patent
Takahashi et al.

(10) Patent No.: US 7,924,383 B2
(45) Date of Patent: Apr. 12, 2011

(54) MULTI-DOMAIN VERTICAL ALIGNMENT LIQUID CRYSTAL DISPLAY DEVICE

(75) Inventors: Satoru Takahashi, Kobe (JP); Masaru Sugiyama, Kobe (JP)

(73) Assignee: Chimei Innolux Corporation, Chu-Nan (TW)

( * ) Notice: Subject to any disclaimer, the term of this patent is extended or adjusted under 35 U.S.C. 154(b) by 118 days.

(21) Appl. No.: 12/152,745

(22) Filed: May 16, 2008

(65) Prior Publication Data
US 2008/0284953 A1  Nov. 20, 2008

(30) Foreign Application Priority Data

May 18, 2007  (JP) .................. 2007-132927

(51) Int. Cl.
*G02F 1/1337* (2006.01)
*G02F 1/1343* (2006.01)

(52) U.S. Cl. ........ 349/129; 349/130; 349/139; 349/143; 349/144

(58) Field of Classification Search .................. None
See application file for complete search history.

(56) References Cited

U.S. PATENT DOCUMENTS

| | | | |
|---|---|---|---|
| 5,309,264 A | 5/1994 | Lien et al. | |
| 6,147,724 A | 11/2000 | Yoshii et al. | |
| 6,285,431 B2 | 9/2001 | Lyu et al. | |
| 6,493,050 B1 | 12/2002 | Lien et al. | |
| 6,570,638 B2 | 5/2003 | Song | |
| 6,738,120 B1* | 5/2004 | Song et al. | 349/139 |
| 7,295,274 B1 | 11/2007 | Wu et al. | |
| 2002/0036740 A1* | 3/2002 | Kubo et al. | 349/129 |
| 2002/0149728 A1 | 10/2002 | Ogishima et al. | |
| 2003/0206262 A1* | 11/2003 | Kim et al. | 349/129 |
| 2005/0146659 A1* | 7/2005 | Ishii et al. | 349/117 |
| 2005/0280761 A1* | 12/2005 | Ishii | 349/130 |
| 2007/0195251 A1* | 8/2007 | Lu et al. | 349/143 |

FOREIGN PATENT DOCUMENTS

| | | |
|---|---|---|
| JP | 06-043461 | 2/1994 |
| JP | 2006-003830 | 1/2006 |
| JP | 2006-154585 | 6/2006 |
| JP | 2006-337676 | 12/2006 |

OTHER PUBLICATIONS

Koike et al., "Super High Quality MVA-TFT Liquid Crystal Displays", FUJITSU Sci. Tech. J., 35, 2, Dec. 1999.

Iwamoto et al., "Improvement of Display Performance of High Transmittance Photo-Aligned Multi-domain Vertical Alignment LCDs Using Circular Polarizers", IDW '02, pp. 85-88.

Iwamoto et al., "Transmittance Enhancement for Randomly Aligned Liquid Crystal Displays with Circular Polarizers", Jpn. J. Appl. Phys. vol. 41 (2002), L1383-1385.

\* cited by examiner

*Primary Examiner* — Hemang Sanghavi
(74) *Attorney, Agent, or Firm* — Liu & Liu

(57) ABSTRACT

A liquid crystal display device is provided for not reducing the aperture ratio and improving transmittance. The liquid crystal display device comprises a substrate with a pixel electrode, a substrate with a common electrode, and a liquid crystal layer therebetween, wherein liquid crystal molecules of the liquid crystal layer are vertically aligned when no voltage is applied, each pixel comprises one or more sub-pixels, and cross-shaped slits are formed on the common electrode corresponding to each sub-pixel.

20 Claims, 4 Drawing Sheets

MULTI-DOMAIN VERTICAL ALIGNMENT LIQUID CRYSTAL DISPLAY DEVICE

CROSS REFERENCE TO RELATED APPLICATIONS

This application is based upon and claims the benefit of priority from the prior Japanese Patent Application No. 2007-132927, filed on May 18, 2007, the entire contents of which are incorporated herein by reference.

BACKGROUND OF THE INVENTION

1. Field of the Invention

The invention relates generally to a multi-domain vertical alignment (MVA) liquid crystal display device, and more particularly to a multi-domain vertical alignment liquid crystal display device for improving transmittance.

2. Description of the Related Art

A liquid crystal display device (LCD) is a flat-panel display providing images with the same quality as a cathode ray tube. An LCD is used as a flat-panel display for personal computers, televisions, mobile phones and various office automated devices, and is expected to gain further popularity in the display market.

Generally, the light transmittance of an LCD device is measured by applying an electric field to a liquid crystal injected between two substrates. An LCD device comprises a pair of transparent substrates with a transparent electrode formed inside and a polarizer disposed outside. The liquid crystal material with a negative dielectric anisotropy filled between the two substrates is vertically aligned (VA). The electric field is generated in the direction perpendicular to the substrate when the voltage is applied to the electrode. The long axis of the liquid crystal molecule is rotated in the direction perpendicular to the electric field. Therefore, in the substrates of the vertically aligned type LCD devices, the transmittance is changed by horizontally moving the vertically aligned liquid crystal molecules according to the vertical electric field applied in the vertical direction. Additionally, a multi-domain vertical alignment method (MVA method) exists, wherein liquid crystal molecules rotating in different directions within a pixel are controlled.

Proposed processes for achieving the MVA method include forming a protrusion on a pixel electrode and a common electrode, forming an opening on the pixel electrode and the common electrode, and combinations thereof. In the method of forming the protrusion, when no voltage is applied, the liquid crystal molecules are vertically aligned and slightly inclined according to the shape of the protrusion. Therefore, when voltage is applied, the liquid crystal molecules are inclined toward a predetermined direction. The method of forming the opening is substantially the same as the method of forming the protrusion, wherein the direction of the electric field in the opening is inclined toward the liquid crystal molecules.

However, because it is difficult for voltage to be applied to the protrusion and the opening, transmittance is unfavorably reduced. Accordingly, the overall transmittance is decreased.

Specifically, when the protrusion or the opening is formed, the aperture ratio is deteriorated. It is desirable that the area ratio of the protrusion or the opening is low. However, for example, in a portion where straight openings (hereinafter called the slits) are provided in parallel, the liquid crystal molecules are aligned in a direction perpendicular to the direction in which the slits extend. If the width of each slit is not large enough, the liquid crystal molecules will be unable to align in a direction perpendicular to the direction in which the slits extend. That is, the width of the slit must be larger than a predetermined width.

For example, in a vertically-aligned LCD device method (VA method), viewing angle characteristics are proposed to be improved by dividing each pixel into a plurality of sub-pixel electrodes, directly driving each sub-pixel through a data bus line and a switching element, converting an input image signal, and driving the sub-pixel with a first and a second driving signal corresponding respectively to the hue of a first and a second output. Additionally, a predetermined distance is required, desirably at least three times the thickness of the liquid crystal layer of the pixel, between the slits of the sub-pixel electrodes for regulating the alignment. That is, for an MVA, the aperture ratio of the MVA type LCD panel is decreased when the sub-pixel electrodes is divided by the slit for improving the viewing angle characteristics (as disclosed in the patent reference 1, Jpn. Pat. Appln. Kokai Publication No. 2005-316211).

Further, as shown in FIG. 1a, a circular opening or a protrusion may also be disposed over the pixel electrode or at the center of the pixel over the pixel electrode. The liquid crystal is aligned in a direction shown in FIG. 1a in accordance with the protrusion or the opening of the pixel electrode. Generally, the liquid crystal centers on the opening of the pixel electrode or the protrusion and aligns radially, as shown in the inclination 13 and 14 of the liquid crystal of FIG. 1a. That is, the direction for the liquid crystal alignment changes by 360 degrees around the opening of the pixel electrode or the protrusion. FIG. 6 is a graph depicting a relation between the direction for the liquid crystal alignment and transmittance. When the absorption axis of the linear polarizer makes use of an orthogonal polarizer with an angle of 0 and 90 degrees, the transmittance of the liquid crystal is uniformly divided into eight areas according to the direction of the liquid crystal alignment, i.e., dark, bright, dark, bright, dark, bright, dark, and bright. In FIG. 1a, the inclination 13 of the liquid crystal is a bright area and the inclination 14 of the liquid crystal is a dark area. As a result, since the area with low transmittance becomes equal to half the total area, the entire transmittance is lowered.

A method disclosed in Jpn. Pat. Appln. Kokai Publication No. 2005-106972 (patent reference 2) is proposed to solve such problems by adding dissymmetry molecules to the liquid crystal. However, as the amount of the same material is further increased, the response speed may be decreased. Moreover, though a circular polarizer may be utilized in place of a linear polarizer, undesirably higher costs would also be a result.

BRIEF SUMMARY OF THE INVENTION

The invention provides a multi-domain liquid crystal display device (LCD device) with improved transmittance by narrowing the width of the slit on a common electrode. Additionally, the slit structure of the common electrode has no overlap areas in which the absorption axis of the linear polarizer overlaps the direction of the liquid crystal alignment.

The invention provides an LCD device for improving transmittance comprising a substrate with a pixel electrode, a substrate with a common electrode, and a liquid crystal layer therebetween, wherein the liquid crystal molecules of the liquid crystal layer are vertically aligned when no voltage is applied, each pixel comprises one or more sub-pixels, and cross-shaped slits are formed on the common electrode corresponding to each sub-pixel. The direction of the absorption axis of the linear polarizer disposed in the substrates is equal or within a range of plus or minus 10 degrees with that of the cross-shaped slit.

More specifically, the invention provides an LCD device having liquid crystal molecules in the liquid crystal layer aligned vertically when voltage is not being applied. By forming a cross-shaped slit in each sub-pixel of the common electrode, lowering of transmittance can be prevented and improvement of response speed and alignment stability is achieved.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 6:
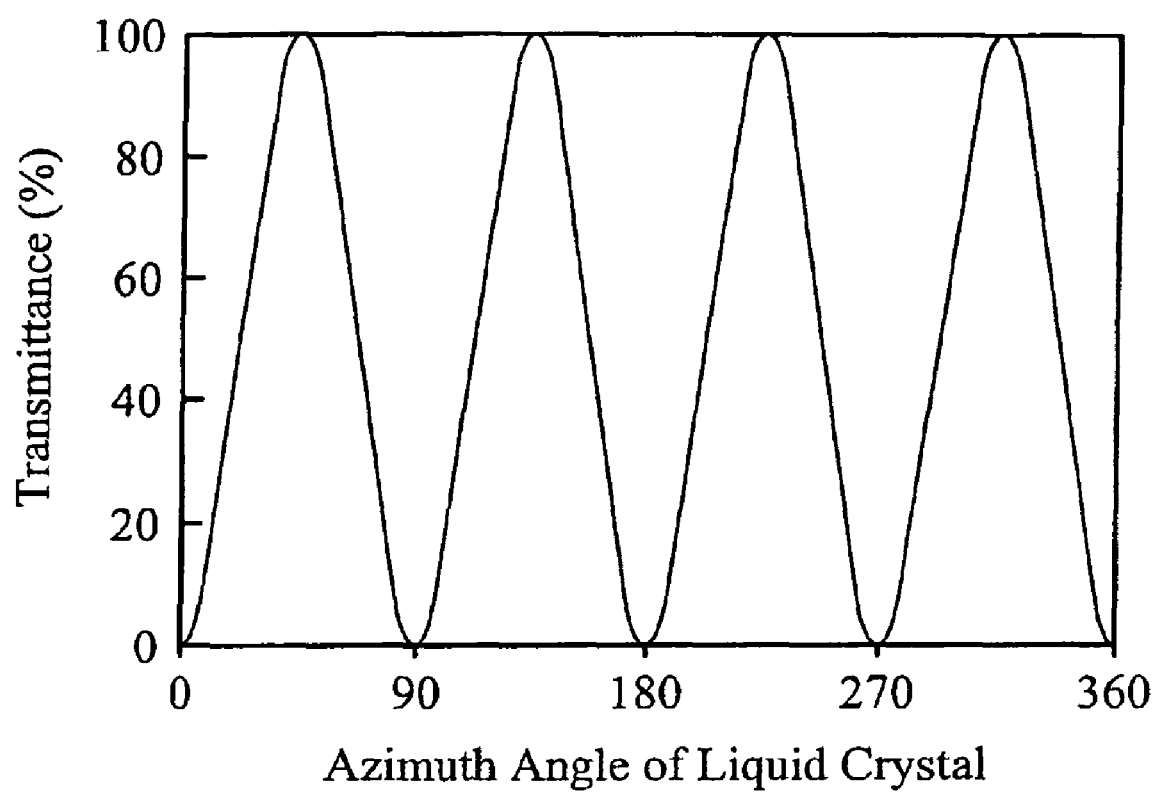
FIG. 6 is a graph showing the relationship between the azimuth angle of liquid crystal alignment and the transmittance in accordance with prior art.

In this invention, it is preferable that the absorption axis of the linear polarizer and the direction of the cross-shaped slit are arranged to incline in the same direction. When the inclination is varied over a range of ±10 degrees in azimuth angle, a significant loss of transmittance is suffered, as shown in FIG. 6, which is a graph of a relationship between the azimuth angle and the transmittance. Accordingly, it is necessary for the azimuth angle to remain within a range of ±10 degrees in order to raise transmissivity of light.

Figure 1A:
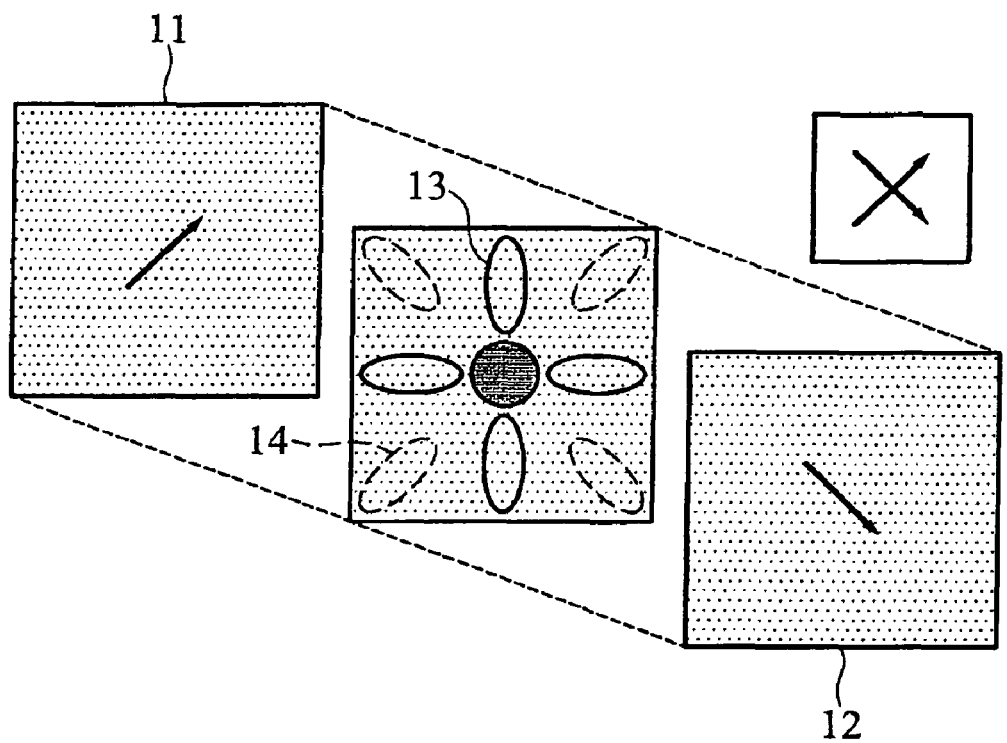
FIGS. 1a and 1b is a plan view showing the arrangement of the cross-shaped slits and the liquid crystal alignment according to prior art and the invention.
Figure 1B:
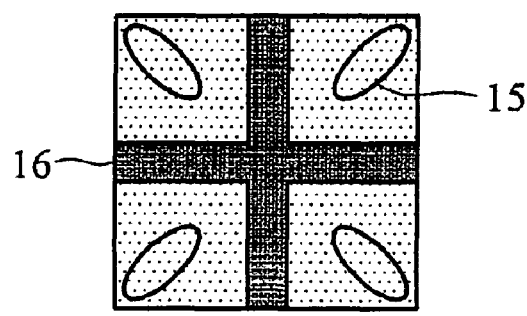

In this invention, each pixel comprises one or more sub-pixels, and each sub-pixel comprises a plurality of areas in accordance with the liquid crystal alignment. FIGS. 1a and 1b is a plan view showing the arrangement of the cross-shaped slits and the liquid crystal alignment according to prior art and the invention.

Further, according to the slit disposed on the pixel electrode, the pixel electrode is divided into a square or a rectangular by the sub-pixel. The sub-pixels of one pixel may be directly connected by the electrode and supplied with same potential levels. Moreover, said sub-pixels may also be driven by different potential levels according to the electrostatic capacity, etc.

As shown in FIG. 1a, a protrusion or an opening of a pixel electrode is formed at the center of the sub-pixel on a common electrode. Therefore, eight areas for different liquid crystal alignments are formed. Among these areas, in the four areas delineated by the dotted lines (for example, area 14), the transmittance is reduced since the absorption axis of the linear polarizer 11 and 12 overlaps the direction of the liquid crystal alignment.

Further, as shown in FIG. 1b, a cross-shaped slit 16 is formed in the location where the middle on each side of the sub-pixel over the common electrode is connected. Accordingly, there are four areas corresponding to the liquid crystal alignment. The absorption axis of the linear polarizer coincides with the slit direction of the cross-shaped slit. Consequently, decrease of the transmittance is avoided as the area where the absorption axis of the linear polarizer coincides with the liquid crystal 15 alignment is disappeared.

Additionally, according to one preferred embodiment of the invention, the ratio of the width of the slit to the cell gap is from at least 1.0 to 3.0. More specifically, it is desirable that the ratio of the width of the slit to the cell gap ranges from 1.2 to 2.5 for the liquid crystal molecule to have an azimuth angle of 45±10 degrees.

Furthermore, according to another preferred embodiment of the invention, it is desirable that the cross-shaped slit is disposed in the location where the middle on each side of the sub-pixel is connected, or disposed diagonally to the sub-pixel.

The LCD device of the invention improves response speed and alignment stability for electronic devices equipped with the LCD device of the invention, such as cellular phones, personal digital assistants (PDA), personal computers, car navigation systems (television) or digital still cameras (DSC).

Figure 2:
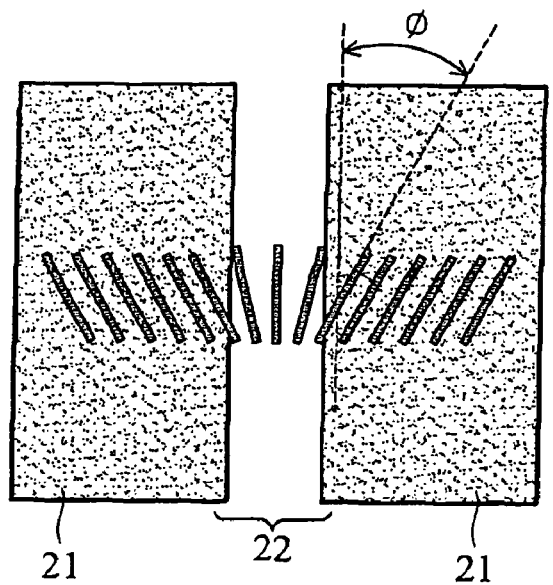
FIG. 2 is a view showing the inclination of the liquid crystal molecule around the slit.

The invention provides an appropriate range for the ratio of the width of the slit to the cell gap (the thickness of the liquid crystal layer), wherein the ratio obtains the best liquid crystal alignment. With reference to FIG. 2, when a slit 22 is disposed in an electrode 21, the liquid crystal near the center of the slit usually inclines in accordance with the slit. The azimuth angle of the surrounding liquid crystal inclines in the direction perpendicular to the slit as the width of slit substantially increases. Furthermore, as the width of the slit decreases, the azimuth angle ($\phi$) of the liquid crystal is correspondingly reduced. However, the surrounding liquid crystal also aligns in accordance with the slit when the width of the slit is extremely narrowed. As a result, the alignment of the liquid crystal molecule according to the slit is insufficient. Therefore, it is necessary to provide a range for the ratio of the width of the slit to the cell gap so that the liquid crystal may be inclined sufficiently.

Figure 3:
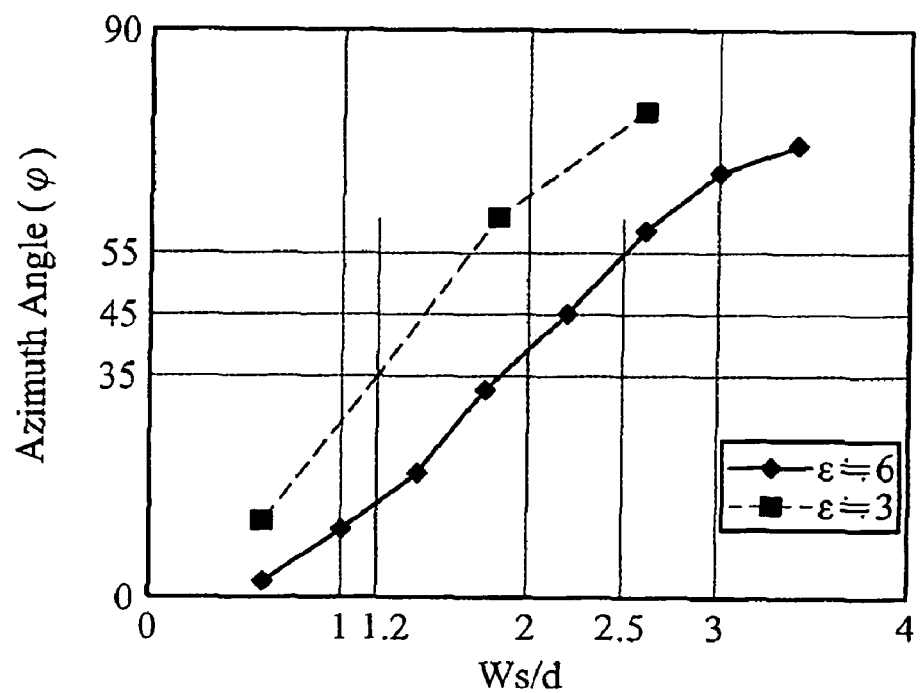
FIG. 3 is a graph showing the relationship between the azimuth angle and the ratio of the width of the slit to the cell gap (Ws/d; horizontal axis) according to the invention.

The azimuth angle ($\phi$) of the liquid crystal around the slit is obtained by simulation with respect to the width of the slit, assuming that relative permittivity ($\epsilon$) of the substrate is 3 (dotted line) or 6 (solid line). FIG. 3 is a graph obtained by simulation to show the relationship between the azimuth angle and the ratio of the width of the slit to the cell gap (Ws/d; horizontal axis) according to the invention. As shown in FIG. 3, the value of Ws/d ranges from at least 1.0 to 3.0 for the slit to widen the azimuth angle of the liquid crystal molecule. More specifically, it is preferable that the value of Ws/d ranges from 1.2 to 2.5 for the liquid crystal molecule to have an azimuth angle of 45±10 degrees.

Figure 4:
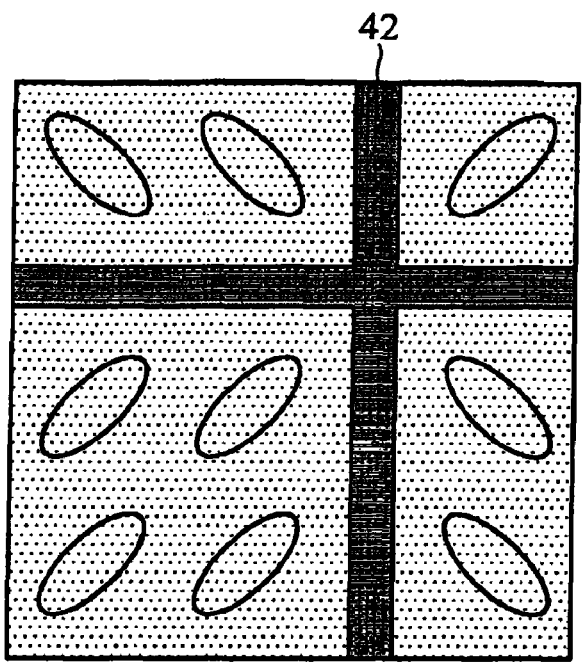
FIG. 4 is a plan view showing location where a cross-shaped slit is formed according to the invention.

According to the embodiment described above, it is unnecessary to dispose a cross-shaped slit in the middle location on each side of the sub-pixel over the common electrode where each side of the sub-pixel is connected. As shown in FIG. 4, a cross-shaped slit 42 may be further disposed at any arbitrary position on each side.

Figure 5:
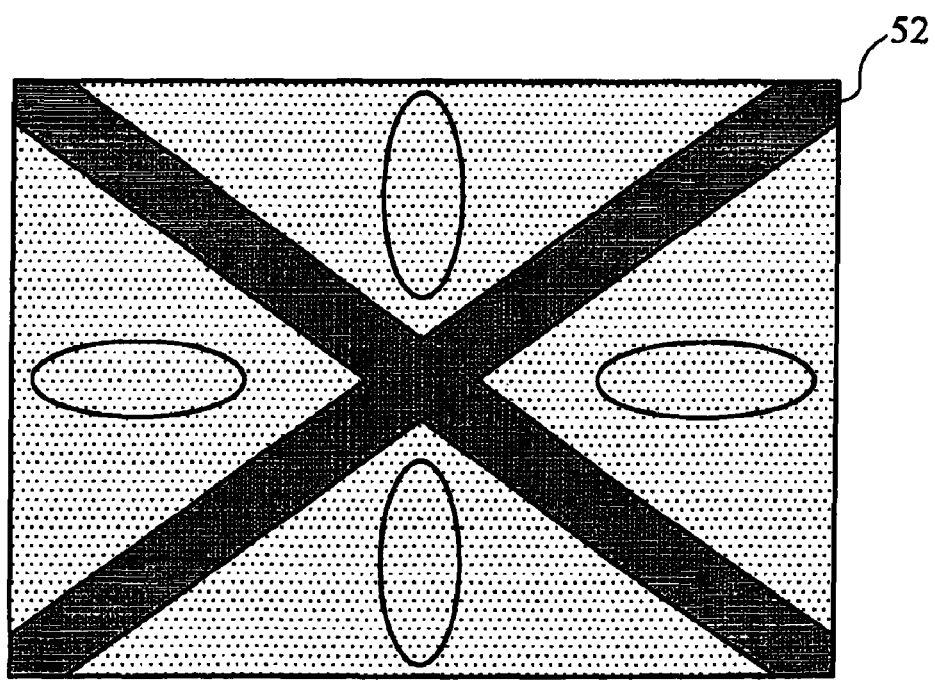
FIG. 5 is a plan view showing a cross-shaped slit arranged diagonal to the sub-pixel according to the invention.

Meanwhile, the position of the absorption axis for the polarizer may be specified, for example, in portable display applications or the like. As shown in FIG. 5, the position of the cross-shaped slit does not need to be parallel (or perpendicular) to each side of the sub-pixel. The cross-shaped slit 52 may be arranged diagonally to the sub-pixel.

According to the embodiment of the invention, the response speed is improved by disposing a plurality of openings on the pixel electrode where the liquid crystal is aligned. Since the width of the slit is narrow, some liquid crystals on the slit also contribute to transmittance. Therefore, the decrease in transmittance is less than prior art examples. Further, alignment stability is improved as the plurality of openings is formed on the pixel electrode where the liquid crystal is aligned. Consequently, tolerance for abnormal alignment of the liquid crystal according to the impact on the liquid crystal device is enhanced.

According to the embodiment of the invention, though a linear polarizer is utilized, it is also effective to use a circular polarizer. The circular polarizer, used for a semi-transmissive LCD device, is a film capable of obtaining circular polarization by arranging the polarizer and ¼ wavelength plate between the backlight and the cell. Using the circular polarization for the cross-shaped slit of the invention also beneficial to achieve effects, such as response speed improvement and alignment stability.

While the invention has been described by way of example and in terms of preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display device, comprising:
   two substrates, wherein one substrate comprises a pixel electrode and the other substrate comprises a common electrode;
   a liquid crystal layer disposed between said two substrates; and
   a pixel having one or more sub-pixels,
   wherein liquid crystal molecules of the liquid crystal layer are vertically aligned when no voltage is applied and cross-shaped slits are formed on the common electrode corresponding to each sub-pixel, and
   wherein the cross-shaped slit is disposed in the center of the sub-pixel and wherein the ratio of the width of the slit to a cell gap between the substrates, except for a crossed area, is from 1.0 to 3.0.

2. The liquid crystal display device according to claim 1 of the invention, wherein two linear polarizers are respectively disposed on the substrates and the direction of the cross-shaped slit is equal or within a range of plus or minus 10 degrees with that of the absorption axis corresponding to one side of the linear polarizer.

3. The liquid crystal display device according to claim 1 of the invention, wherein the cross-shaped slit is disposed diagonally to the sub-pixel.

4. The liquid crystal display device according to claim 1 of the invention, further comprising circular polarizers.

5. An electronic device comprising the liquid crystal display device according to claim 1 of the invention, wherein the electronic device is one of a mobile phone, a personal digital assistant (PDA), a personal computer, a car navigation system (television), a digital still camera (DSC) and a display.

6. The liquid crystal display device according to claim 1 of the invention, wherein the ratio of the width of the slit to the cell gap between the substrates, except for the crossed area, is from 1.2 to 2.5.

7. The liquid crystal display device according to claim 1 of the invention, wherein the cross-shaped slit extend to reach the middle of each side of the sub-pixel.

8. A liquid crystal display device, comprising:
   two substrates, wherein one substrate comprises a pixel electrode and the other substrate comprises a common electrode;
   a liquid crystal layer disposed between said two substrates; and
   a pixel having one or more sub-pixels,
   wherein liquid crystal molecules of the liquid crystal layer are vertically aligned when no voltage is applied and cross-shaped slits are formed on the common electrode corresponding to each sub-pixel, and
   wherein the cross-shaped slits extend to reach the middle of each side of the sub-pixel, and wherein the ratio of the width of the slit to a cell gap between the substrates, except for a crossed area, is from 1.0 to 3.0.

9. The liquid crystal display device according to claim 8 of the invention, wherein the ratio of the width of the slit to the cell gap between the substrates, except for the crossed area, is from 1.2 to 2.5.

10. An electronic device comprising the liquid crystal display device according to claim 8 of the invention, wherein the electronic device is one of a mobile phone, a personal digital assistant (PDA), a personal computer, a car navigation system (television), a digital still camera (DSC) and a display.

11. A liquid crystal display device, comprising:
    two substrates, wherein one substrate comprises a pixel electrode and the other substrate comprises a common electrode;
    a liquid crystal layer disposed between said two substrates; and
    a pixel having one or more sub-pixels,
    wherein liquid crystal molecules of the liquid crystal layer are vertically aligned when no voltage is applied and cross-shaped slits are formed on the common electrode corresponding to each sub-pixel, and
    wherein the cross-shaped slit is disposed in the center of the sub-pixel, and wherein two linear polarizers are respectively disposed on the substrates and the direction of the cross-shaped slit is equal or within a range of plus or minus 10 degrees with that of the absorption axis corresponding to one side of the linear polarizer.

12. The liquid crystal display device according to claim 11 of the invention, wherein the ratio of the width of the slit to the cell gap between the substrates, except for a crossed area, is from 1.0 to 3.0.

13. The liquid crystal display device according to claim 12 of the invention, wherein the ratio of the width of the slit to the cell gap between the substrates, except for the crossed area, is from 1.2 to 2.5.

14. The liquid crystal display device according to claim 11 of the invention, wherein the cross-shaped slit extend to reach the middle of each side of the sub-pixel.

15. The liquid crystal display device according to claim 14 of the invention, wherein the ratio of the width of the slit to a cell gap between the substrates, except for a crossed area, is from 1.0 to 3.0.

16. The liquid crystal display device according to claim 15 of the invention, wherein the ratio of the width of the slit to the cell gap between the substrates, except for the crossed area, is from 1.2 to 2.5.

17. The liquid crystal display device according to claim 11 of the invention, wherein the cross-shaped slit is disposed diagonally to the sub-pixel.

18. The liquid crystal display device according to claim 17 of the invention, wherein the ratio of the width of the slit to a cell gap between the substrates, except for a crossed area, is from 1.0 to 3.0.

19. The liquid crystal display device according to claim 18 of the invention, wherein the ratio of the width of the slit to the cell gap between the substrates, except for the crossed area, is from 1.2 to 2.5.

20. An electronic device comprising the liquid crystal display device according to claim 11 of the invention, wherein the electronic device is one of a mobile phone, a personal digital assistant (PDA), a personal computer, a car navigation system (television), a digital still camera (DSC) and a display.

* * * * *